R. E. LAND.
RUNNING-IN MACHINE FOR GASOLENE MOTORS.
APPLICATION FILED JUNE 9, 1919.
1,344,907.
Patented June 29, 1920.
2 SHEETS—SHEET 2.
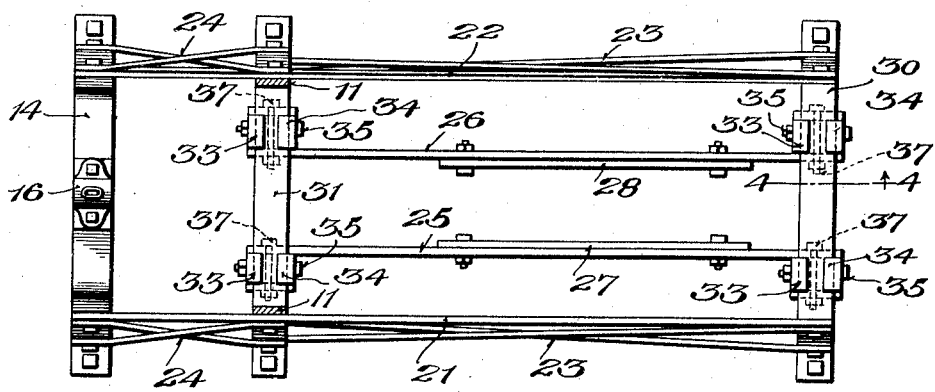
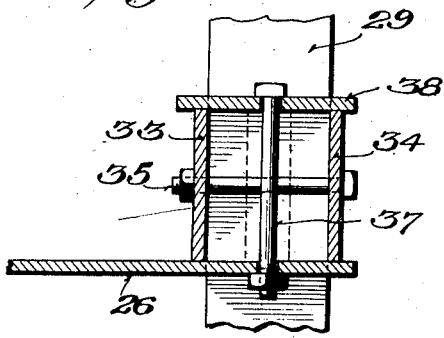
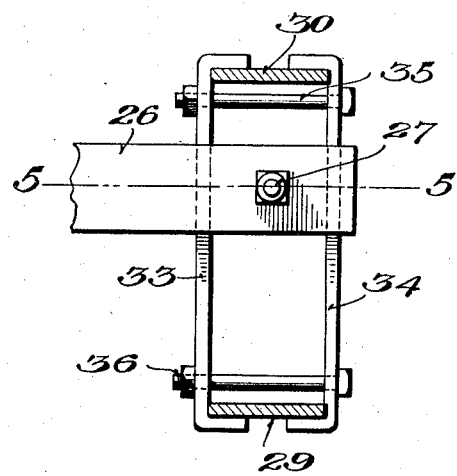
Inventor
R. E. Land,
By Foster, Freeman, Watson & Coit,
Attorneys
Witness
Chas. L. Griesbauer

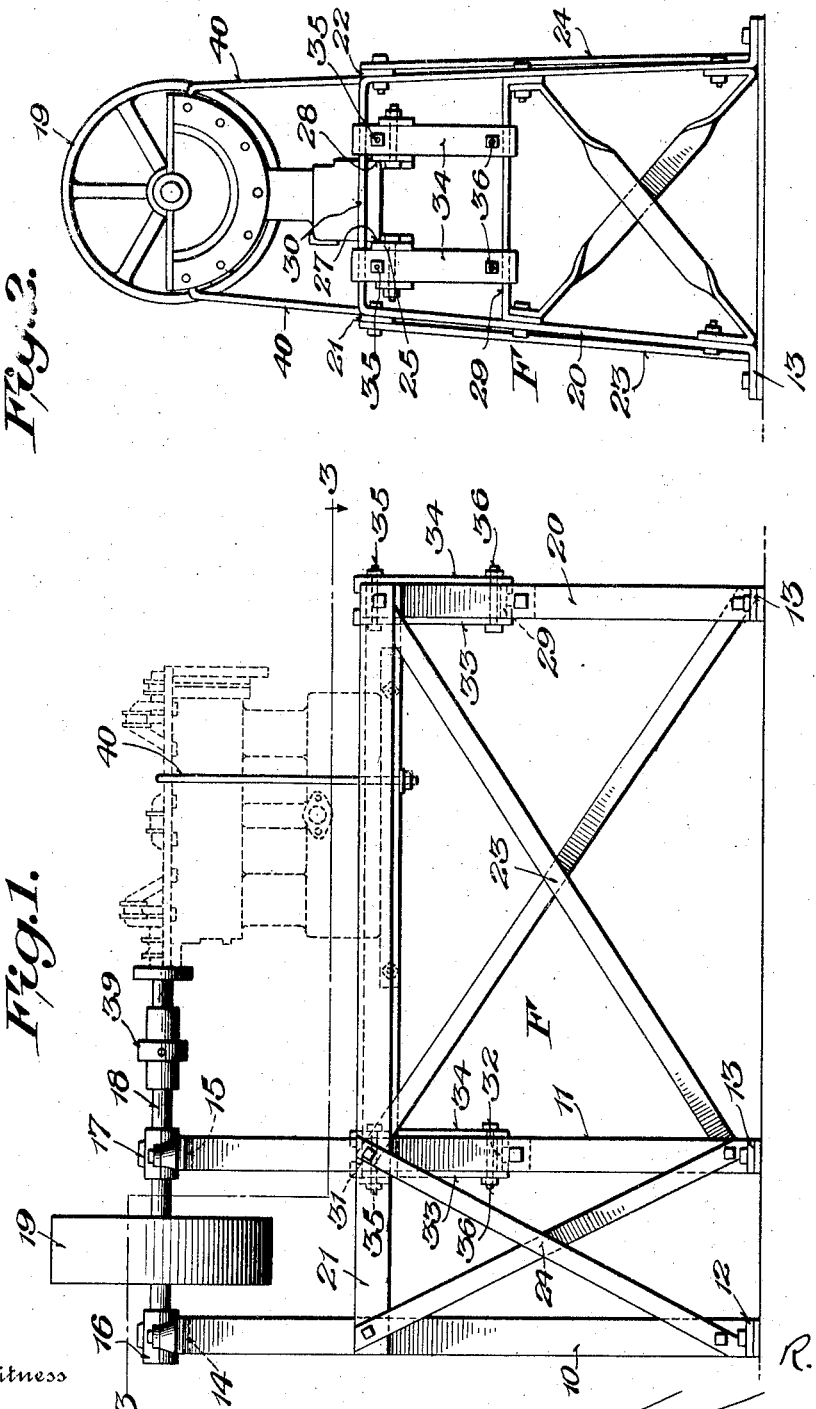

UNITED STATES PATENT OFFICE.

ROBERT E. LAND, OF ALBANY, GEORGIA.

RUNNING-IN MACHINE FOR GASOLENE-MOTORS.

1,344,907. Specification of Letters Patent. Patented June 29, 1920.

Application filed June 9, 1919. Serial No. 302,812.

*To all whom it may concern:*

Be it known that I, ROBERT E. LAND, a citizen of the United States, and residing at Albany, Dougherty county, State of Georgia, have invented certain new and useful Improvements in Running-In Machines for Gasolene-Motors, of which the following is a specification.

The present invention relates to an apparatus for burning and running-in the bearings of hydrocarbon motors, particularly of the type employed in motor vehicles.

It is the principal object of the invention to provide a simple apparatus of this character adapted to support a motor in inverted position so that the bearings are easily accessible for inspection and adjustment while the operation of burning or running-in the bearings is taking place. It is a further object of the invention to provide an apparatus which is adjustable to support motors of different sizes.

Other objects and features of novelty will be apparent from the description taken in connection with the drawings in which:

Figure 1 is a side elevation of an apparatus constructed in accordance with the present invention and illustrating a motor supported thereon;

Fig. 2 is an end elevation of the parts shown in Fig. 1;

Fig. 3 is a sectional plan view taken substantially on the line 3—3 of Fig. 1, the motor being removed;

Fig. 4 is a sectional elevation to an enlarged scale of a detail, the section being taken substantially on the line 4—4 of Fig. 3;

Fig. 5 is a sectional plan view taken substantially on the line 5—5 of Fig. 4.

Referring to the drawings the reference letter F indicates as a whole the supporting frame of the apparatus. As shown this frame consists of two members 10 and 11 bent into an inverted U shape and provided at their lower ends with the feet 12 and 13. As shown these members 10 and 11 are disposed in parallel spaced relation and their upper horizontal portions 14 and 15 carry the bearings 16 and 17 for a shaft 18 driven by means of the pulley 19. A frame member 20 of the same general shape as the members 10 and 11 but of less height is disposed in spaced relation to the member 11. The U shaped members 10, 11 and 20 are held in position by the longitudinal horizontal members 21 and 22 and the bracing 23 and 24.

According to this invention the hydrocarbon motor is adapted to be supported on the frame in an adjustable manner so that motors of different sizes may be accommodated and so that the motors are positioned with their crank shafts uppermost and in substantial alinement with the driven shaft 18. As shown for these purposes, the motor is inverted and its lower or head end supported on the bars 25 and 26. Preferably these bars are provided with longitudinally extending rabbeted edges or seats 27 and 28 respectively for the opposite lower edges of the motor head. The bars 25 and 26 are carried by the frame for adjustment horizontally and vertically. As clearly shown in Figs. 1 and 2 a cross member 29 is secured to the frame member 20 in a position parallel to and below the horizontal top portion 30 of said member 20. Similar cross members 31 and 32 are secured to the legs of the frame member 11. Each of the bars 25 and 26 adjacent their ends are bolted to a pair of U shaped clamps 33 and 34. As clearly shown in Fig. 4 these clamps are disposed on opposite sides of the transverse members 29, 30, 31 and 32, and are clamped to the same by means such as bolts 35 and 36. It will be seen that by loosening the bolts 35 the clamps may be adjusted along the transverse members thus increasing or decreasing the space between the bars 25 and 26 to accommodate motors of different sizes. The ends of the bars 25 and 26 are clamped to the vertical clamps 33 and 34 in the manner shown in Fig. 5. Thus a bolt 37 extends through the bars between the clamps 33 and 34 and on the side of the clamps opposite the bars passes through an abutment plate 38. It will be observed that by manipulating the bolts 37, the bars 25 and 26 may be adjusted vertically on the vertical clamp members 33 and 34.

In order to place a motor on the apparatus the bars 25 and 26 are adjusted and secured in proper spaced relation to receive the head end of the motor. The motor is then placed on these bars and adjusted vertically to bring the crank shaft thereof in alinement with the driven shaft 18, this being possible as the bars 25 and 26 are adjustable vertically. The crank shaft of the motor may be connected to the driven shaft 18 by means of a universal coupling 39. In order to hold the motor firmly on the seats of the bars 25 and 26 the rods 40 are provided which extend from the horizontal members 21 and 22 and at their upper ends are bent to engage over the upper surface of the crank case of the motor.

After the motor is thus positioned in the apparatus the shaft 18 is rotated from pulley 19. It will be observed that the apparatus supports the motor with the crank shaft uppermost where the bearings are easily accessible for inspection and adjustment as burning and running-in operations are carried on.

Although an apparatus for carrying out the invention has been described in detail it is to be understood that the invention is not thus limited but includes modifications and changes which come within the scope of the appended claims.

Having thus described the invention what is claimed as new and desired to be secured by Letters Patent is:

1. Apparatus of the character described including in combination, a frame, a driven shaft mounted on said frame, means to support a hydrocarbon motor on said frame with its crank shaft uppermost and substantially in alinement with said driven shaft, said means being adjustable vertically and transversely of the frame, and means to connect said driven shaft to the motor shaft.

2. Apparatus of the character described including in combination, a frame, a driven shaft mounted on said frame, means to support a hydrocarbon motor on said frame with its crank shaft uppermost and substantially in alinement with said driven shaft including a pair of spaced supporting members engaging opposite sides of the motor, and means supporting said members for adjustment in two directions; and means to connect said driven shaft to the motor shaft.

3. In apparatus of the character described including in combination, a frame, a driven shaft mounted on said frame, means to support a hydrocarbon motor in inverted position with its crank shaft substantially alined with said driven shaft including a pair of parallel bars provided with seats for the lower opposite edges of the motor, means supporting said bars on the frame for horizontal and vertical adjustment, and means to connect said driven shaft to the motor shaft.

4. In apparatus of the character described, in combination, a frame, a driven shaft mounted on said frame, means adapted to support a hydrocarbon motor on said frame in inverted position with its crank shaft substantially alined with said driven shaft, means to connect the said driven shaft to the motor crank shaft, said first mentioned means comprising a pair of parallel horizontal bars, vertical members supporting said bars for vertical adjustment, and means securing said members to the frame for adjustment horizontally.

In testimony whereof I affix my signature.

ROBERT E. LAND.